C. SELLE.
BOLT.
APPLICATION FILED JAN. 28, 1919.

1,335,613.

Patented Mar. 30, 1920.

Witnesses
K. A. Thomas
T. E. Turpin

Inventor
Cuno Selle

By Victor J. Evans
Attorney

UNITED STATES PATENT OFFICE.

CUNO SELLE, OF OAKLAND, CALIFORNIA.

BOLT.

1,335,613.                  Specification of Letters Patent.       Patented Mar. 30, 1920.

Application filed January 28, 1919. Serial No. 273,507.

*To all whom it may concern:*

Be it known that I, CUNO SELLE, a citizen of the United States, residing at Oakland, in the county of Alameda and State of California, have invented new and useful Improvements in Bolts, of which the following is a specification.

My present invention pertains to bolts for use in conjunction with nuts.

The object of my invention is the provision of a bolt which while inexpensive is highly advantageous when used in the construction of steel ships.

Another object of the invention is the provision of a bolt in combination with a nut through the medium of which the bolt may be held against turning during the removal of a standard nut therefrom.

Incidental to the construction of steel ships much time and labor are wasted because of the difficulty that attends the removal of a nut from a bolt employed for holding two or more plates together, this because of the tendency of the bolt to turn in the plates and because there is no way extant for holding the bolt against turning at the side where the nut is located, and frequently it is necessary for an extra man to hold the bolt by its head against turning, and for the said extra man in many cases to lose the time necessary for him to move from the outer side of the construction to the inner side thereof.

My novel bolt and its complementary holding nut obviate the objections indicated; and the novelty, utility and practical advantages of the same will be fully understood from the following description and claims when the same are read in connection with the drawings, accompanying and forming part of this specification.

Similar numerals of reference designate corresponding parts in all of the views of the drawings.

Figure 1:
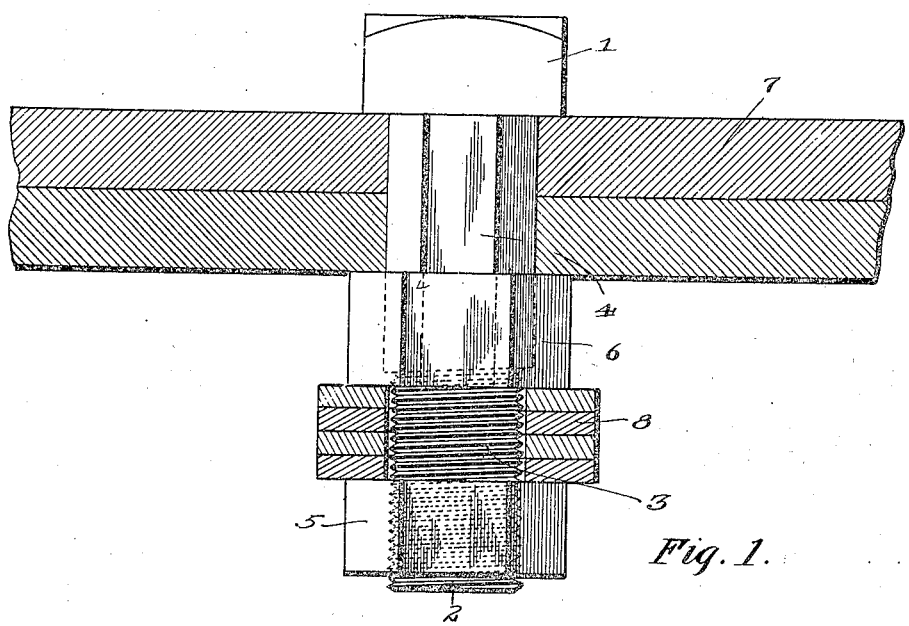
Figure 1 is a view, partly in section and partly in plan, illustrating my improvement as applied.
Figure 2:
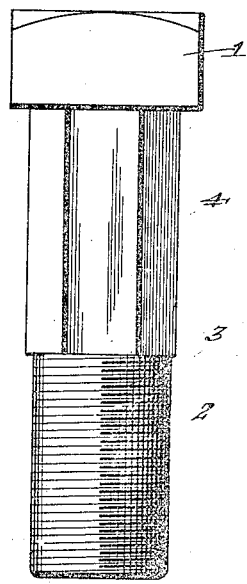
Fig. 2 is a view of the bolt *per se*.
Figure 3:
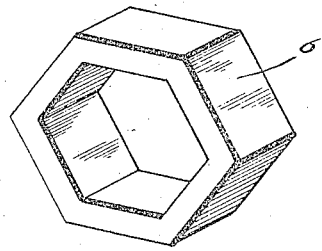
Fig. 3 is a view of the novel holding nut *per se*.

My novel bolt is provided with a standard or other suitable head 1, and standard or other suitable thread 2 on its shank 3; the said thread 2 being formed on the end portion of the shank and being spaced about the proportional distance illustrated from the head.

The portion 4 of the shank intermediate of the head 1 and the thread 2 is of angular form in cross section, and in the present embodiment of my invention I make the said portion 4 hexagonal in cross section, as shown.

In conjunction with the bolt I contemplate using a standard or other nut 5; and I also use a nut 6. This nut 6 is exteriorly of angular form in cross section, and is interiorly of the same form in cross section as the shank portion 4 of the bolt.

In the practical use of my improvement the bolt shank is extended outwardly through two or more plates 7, as illustrated in Fig. 1, and the holding nut 6 is then moved rectilinearly of the threaded portion of the shank and on the angular portion 4 thereof, after which one or more washers 8 are mounted on the threaded portion of the shank with the inner washer against the holding nut 6, after which the standard nut 5 is turned on the threaded portion of the shank and against the outer washer.

By virtue of the provision described it will be manifest that when the bolt is held against turning through the medium of a wrench or the like applied to the holding nut 6, the nut 5 may be readily turned on and off the bolt shank when necessity demands; and it will also be manifest that a single workman is enabled to concurrently hold the nut 6 and the bolt against turning while he is engaged in turning the standard nut 5 on or off the bolt shank.

It will further be appreciated from the foregoing that the improved bolt in combination with the holding nut complementary thereto, does not render the construction unduly expensive, and does not materially increase the labor incidental to the placing and the securing of the bolt in position.

Having described my invention, what I claim and desire to secure by Letters Patent is:—

1. Means for the purpose described comprising a bolt having a head and a shank with a threaded portion spaced from the head, and a portion, of uniform angular cross section, extending between the head and the threaded portion; and a holding nut, interiorly of angular form in cross-section, adjustable rectilinearly on the angular portion of the bolt shank.

2. In ship construction the combination of opposed apertured plates, a bolt having a head disposed at one side of one plate and also having a shank extending through the apertures in the plates; said shank having an angular portion and a threaded portion, the angular portion of uniform cross-section extending from the head to the threaded portion, a holding nut that is interiorly of angular form in cross section mounted on the angular portion of the shank, a nut mounted on the threaded portion of the shank, and spacing means interposed between the holding nut and the threaded nut.

In testimony whereof I affix my signature.

CUNO SELLE.